United States Patent [19]

Noble

[11] Patent Number: 5,090,283
[45] Date of Patent: Feb. 25, 1992

[54] SAW TABLE

[76] Inventor: Walter E. Noble, 69 Prennan Avenue, Islington, Ontario, Canada, M9B 4C2

[21] Appl. No.: 525,585
[22] Filed: May 21, 1990
[51] Int. Cl.$^5$ .............................................. B27B 27/10
[52] U.S. Cl. ................... 83/467.1; 83/468.1; 83/468.4; 83/468.6; 269/303; 269/315
[58] Field of Search ................ 83/471.2, 477.2, 397.1, 83/467.1, 468.4, 468.1, 468.2, 468.5, 468.6, 829, 821; 144/286 R, 286 A; 269/315, 316, 317, 303, 304

[56] References Cited

U.S. PATENT DOCUMENTS

| | | | |
|---|---|---|---|
| 942,613 | 12/1909 | Chow | 269/317 |
| 2,899,989 | 8/1959 | Sells | |
| 3,901,498 | 8/1975 | Novak | 83/581 |
| 4,007,657 | 2/1977 | Burch | 83/471 |
| 4,158,320 | 6/1979 | Kay | 83/477.2 |
| 4,163,404 | 8/1979 | Lavis | 83/165 |
| 4,300,426 | 11/1981 | Weaver | 83/471 |
| 4,782,871 | 11/1988 | Aigner | 269/315 |
| 4,909,111 | 3/1990 | Noble | 83/574 |

Primary Examiner—Frank T. Yost
Assistant Examiner—Allan M. Schrock
Attorney, Agent, or Firm—Kenneth M. Garrett

[57] ABSTRACT

In a saw table of the type including an elevated track in which the sole plate of a circular saw is engageable, improvements include the provisions of a cross-cut fence which is rotatable about its axis to be movable to a stored, non-obstructing position; the provision of an adjustable miter fence; the provision of a telescopically adjustable track stop to increase the effective cutting length on the table, and the provision of an improved blade guard retractor.

11 Claims, 4 Drawing Sheets

SAW TABLE

FIELD OF INVENTION

This invention relates to improvements to a saw table in the nature of that described in my U.S. Pat. No. 4,909,111, the contents of which are incorporated herein by reference thereto.

BACKGROUND OF INVENTION

In my above mentioned patent a saw table for use with normally hand-held circular saws comprises a bed having a forward end, being that end at which an operator of the saw would stand, and a rearward end. Adjacent the rearward end there is located a miter fence which in plan view comprises two arms in a 90° V formation, the apex of which points towards the forward end of the table. A pair of parallel rails are mounted above the surface extending from front to back of the table. Each rail has a track therealong, in which tracks the sole plate of the saw, or an auxiliary sole plate to which that of the saw may be attached, is engageable for movement of the saw over the surface of the table.

The saw is engaged in the tracks with the handle of the saw pointing towards the forward end of the table, and cutting is preferably effected by pulling the saw through the work piece, in the manner of a radial arm saw operation. Cross-cuts are easily effected by using an auxiliary table; the rearward edge of this auxiliary table has a complementary V formation to that of the miter fence, against which it will abut, and the forward edge, against which the work piece will abut, is transverse to the direction of the track.

Such arrangement is suited for the majority of trim work likely to be undertaken when using the saw table. However in those instances where thicker or wider work pieces are to be sawn, the presence of the auxiliary table is an encumbrance. Additionally, the necessity of abutting the auxiliary table against the miter fence makes it desirable that the miter fence be permanently fixed in position.

The track is preferably provided with a stop adjacent each end to prevent the inadvertent disengagement of the saw therefrom. Given that it is undesirable that the track overhang the table, and given that the sole plate of a saw normally has a length substantially greater than the diameter of the saw blade, the track stop generally acts to limit the travel of the cutting edge of the saw blade well prior to it being in proximity to the ends of the table, thereby unnecessarily restricting the usable surface of the saw table.

Portable circular saws are normally provided with a blade guard that will retract automatically when the saw is pushed into the work piece. When the saw is pulled into the work piece it is desirable to provide a means for automatically retracting the blade. In my above mentioned patent I provided one such means, which is the nature of a recoil reel which locates on the rail. While this performs in a satisfactory manner, it is relatively expensive, and adds significantly to the manufacturing costs of what is intended to be a relatively low cost item.

SUMMARY OF THE INVENTION

In accordance with one aspect of my invention, a saw table of the type described hereinabove is provided with a cross-cut fence that is mounted for rotation about a transverse axis for movement between first and second positions. In the first position, one wall of the cross-cut fence is upstanding from the surface of the table. In the second position the one wall of the cross-cut fence does not protrude above the surface of the bed, and is preferably continuous with the surface, so as to neither form an encumbrance for a work piece located anywhere on the table, nor form a groove for the accumulation of debris.

Preferably, the saw table is provided with spring means biasing the cross-cut fence into its first position. Also preferably, the cross-cut fence comprises another transversely aligned wall, the one wall and the other wall being in orthogonal relationship, whereby when the cross-cut fence is in the first position, the other wall is generally continuous with the surface of the table.

Desirably, the bed of the saw table is provided with a slot open on the underside thereof to receive the cross-cut fence. Accordingly, rotation of the cross-cut fence from the first position to the second position acts to automatically dump any accumulation of sawdust adjacent the fence, which if not removed impedes the accurate positioning of the work piece against the fence. Preferably the slot is substantially closed by the other wall when the cross-cut fence is in its first position, and by the one wall when in its second position.

The rotatability of the cross-cut fence to a non-obstructing position permits the cross-cut fence to be located closely adjacent to the miter fence. In accordance with another aspect of the invention, at least one arm of the miter fence is mounted to be movable into positions across the cross-cut fence when this is rotated to its second position, thereby facilitating the cutting of miter joints with angles other than 45°, compound miter joints and scarf joints.

In accordance with a further aspect of the invention, the limit stop adjacent at least the forward end of the table is telescopically mounted from a rail. When fully extended, the stop permits the sole plate of the saw to overhang the table, and the cutting edge of the saw blade to approach more closely to the table end, thereby maximizing the utilizable cutting area of the table. When retracted the stop will preferably not overhang the table, so as not to snag on clothing of an operator or to be subject to accidental damage.

In accordance with yet another aspect of the invention at least one rail of a saw table of the foregoing nature is provided with an opening therealong. A pulley sheave aligned with the opening is mounted in fixed relation to the rail adjacent the rearward end of the table for rotation in a vertical plane. An extensible tether locates in the opening, one end of the tether being secured in fixed relation to the rail adjacent the forward end thereof, the other end passing around the pulley sheave and having a hook attached thereto. When the tether is retracted, it will pull the hook into proximity with the pulley sheave. When the tether is extended, it will permit the hook to travel to a position proximate to the forward end of the table. In use, the hook is engaged with the blade guard of a circular saw mounted on the table, to thereby retract the blade guard at all positions of travel of the saw along the tracks. The rails are suitably formed as hollow metal extrusions, whereby the opening extends throughout the complete length of the rails. Expediently, the extensible tether comprises a helical spring portion which extends from adjacent the forward end of the rail to approximately fifteen percent of the length thereof, and an inextensible portion connecting the rearward portion of the spring to the hook. Alternatively the tether may consist of an elastic cord suitably protected by a braided fabric.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
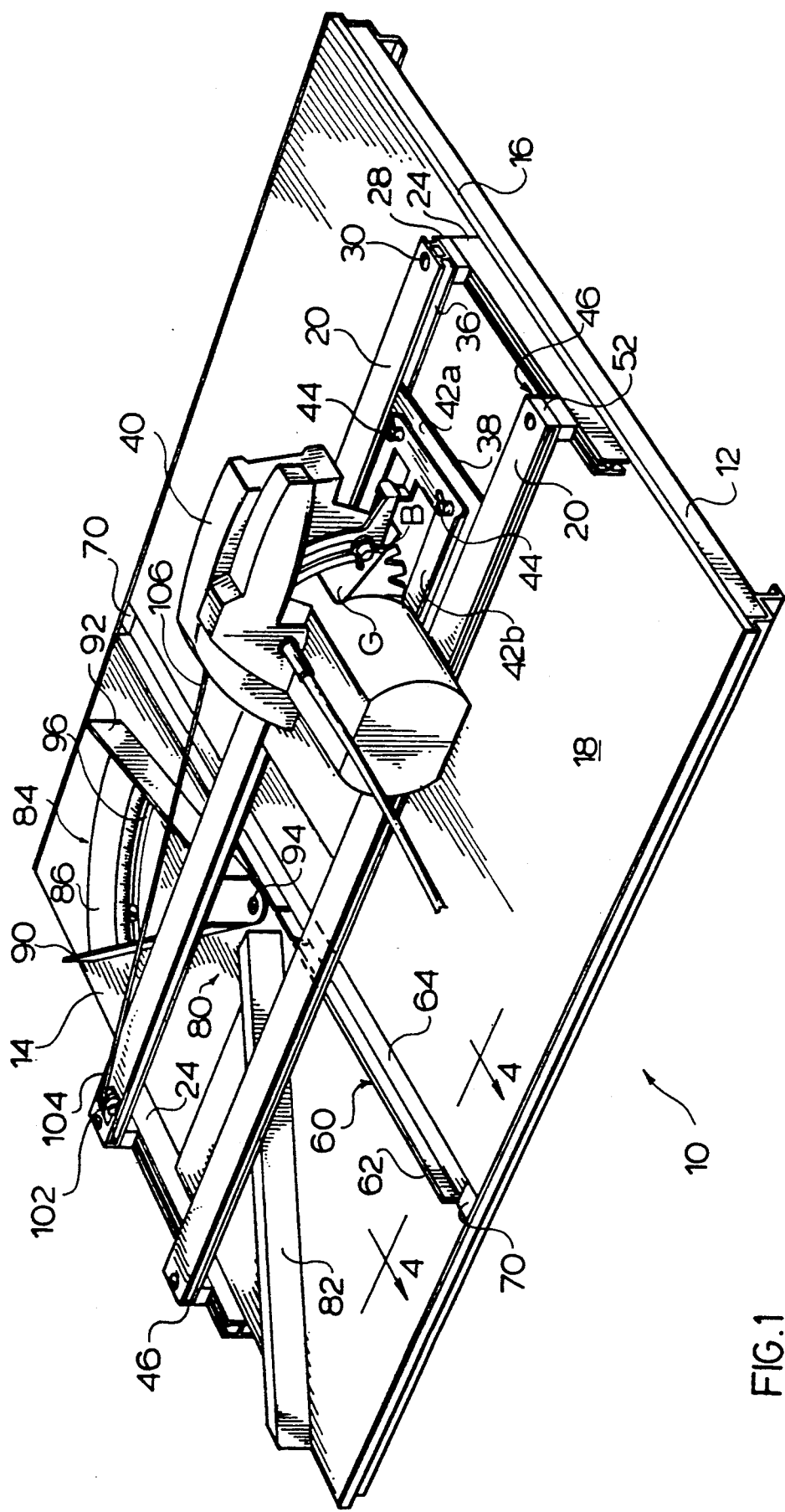
FIG. 1 is an isometric view from the top, front, left side of a saw table in accordance with the invention in one mode of adjustment with a circular saw mounted thereon.

Considering the drawings in detail wherein like parts are identified by like numbers throughout, an improved saw table in accordance with the invention is identified generally therein by the numeral 10. Saw table 10 has a forward end 12 and axially opposed thereto a rearward end 14, and a bed 16 having a planar work surface 18. A pair of rails 20 are secured above surface 18 in parallel relation thereto and to each other, and extend substantially from end to end of table 10. The means for securing rails 20 comprises a pair of channel members 24 respectively extending transversely along medial portions of each end 12, 14 of table 10 and secured to bed 16 in fixed, upstanding relationship by any convenient means (not shown in the Figures). Channel members 24 each have a groove 26 in the upper surface thereof extending along the length thereof. Conveniently channel members 24 are formed as metal extrusions and have a constant cross-section. A small spacer block 28 is interposed between channel members 24 and rails 20. Machine screws 30 pass through rails 20 and spacer blocks 28 to engage nuts 32 that are captive in grooves 26 and slidable therealong. Each rail 20 is provided with a track 36 therealong within which is engaged the sole plate 38 of a circular saw 40 for slidable movement therealong. As illustrated in FIG. 1, sole plate 38 conveniently comprises a first part 42A which may be detachably mounted in tracks 36, and a second part 42B which may be permanently attached to the saw, and clamps 44 for retaining the two parts of the sole plate in fixed relation. A stop 46 is provided at each axial end of at least one of rail 20, here shown as the left hand side rail, for engaging the sole plate 38 of saw 40 to restrict its longitudinal travel along tracks 36 and the inadvertent disengagement of the saw therefrom, and also for preventing the accidental cutting of channel members 24 by the blade B of the saw.

While there is no critical restriction of the length of rails 20, it is found that they are more susceptible to accidental damage where they project axially beyond the table 10, and they are also more prone to snagging on the clothing of an operator. Where stops 46 are provided in axially fixed relation to table 10, they will act to limit the travel of saw 40 somewhat prior to the approach of blade B to channel members 24, thereby in effect creating an unnecessary restriction on the usable length of table 10. In the instant embodiment stops 46 include a U shaped channel section 48, the bright of which is provided with a slotted opening 50 therealong, and one axial end of which is closed by an end wall 52. Stop 46 is telescopically mounted from rail 20 and captured therein by machine screw 30 which passes through slotted opening 50. As saw 40 moves on tracks 36 to adjacent an axial end of table 10, sole plate 38 engages end wall 52 of stop 46, further movement of saw 40 thereafter serving to extend the stop outwardly from rail 20, until the travel limit of stop 46 is reached. At this position, sole plate 38 will extend axially outwardly from rails 20, and blade B will approach to channel member 24 moderately closely, to maximize the utilizable length of table 10.

A cross-cut fence 60 is provided intermediate the ends 12, 14 of table 10. Cross-cut fence 60 has an L shaped cross-section, and comprises first wall 62 and second wall 64 in orthogonally intersecting relationship, conveniently formed as an extrusion. Cross-section fence 60 has an opening therethrough in which locates a hinge pin 66. Bed 16 has a slot 68 extending transversely thereacross in communication with work surface 18 and the underside of bed 16. A small trunnion block 70 locates in slot 68 at each lateral side of table 10, within which trunnion blocks hinge pin 66 is received so as to permit cross-cut fence 60 to rotate thereabout. A spring 74 is secured between the under-side of cross-cut fence 60 and table 10 acting to bias cross-cut fence 60 to a position in which first wall 62 is upstanding from work surface 18. Second wall 64 is provided with a small lip 76 which engages the underside of bed 16 to preclude over-rotation of cross-cut fence 60, thereby indexing first wall 62 in its upstanding position, and also simultaneously indexing second wall 64 to a position substantially coplanar with work surface 18, in which position it substantially covers slot 68. Cross-cut fence 60 is rotatable by finger pressure against the bias of spring 74 to a second position wherein first wall 62 is generally coplanar with work surface 18 and substantially covers slot 68.

Figure 7:
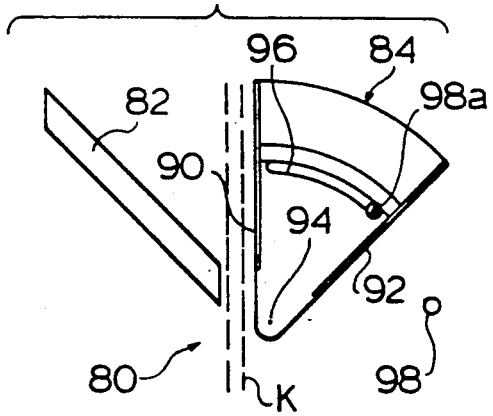
FIGS. 7 and 8 show in schematic plan view geometric detail of portions of the miter fence in differing positions of adjustment.
Figure 8:
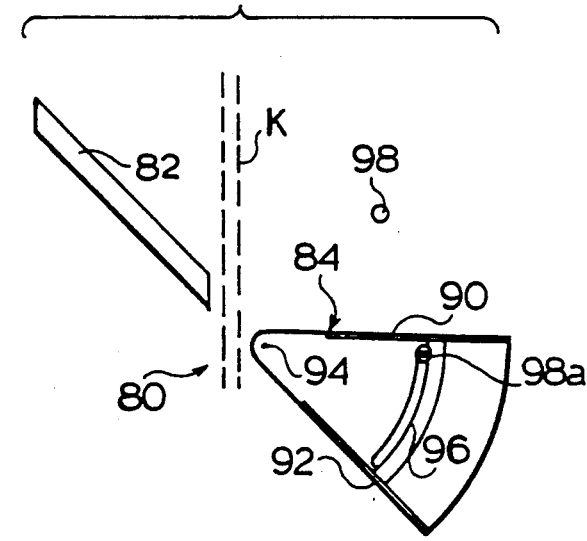

A miter fence 80 is provided intermediate cross-cut fence 60 and the rearward end 14 of table 10. Miter fence 80 comprises a first fixed, arm 82 subtending an angle of 45° to the axial direction, and a second arm 84. Second arm 84 is conveniently formed from sheet metal and comprises a planar central portion 86 in the form of a 45° circular segment which overlays work surface 18. Second arm 84 has lateral sides 90, 92 vertically upstanding from central portion 86 and extending part way along. Sides 90, 92 have a height to permit them to pass between rails 20 and work surface 18. Second arm 84 is pivotally connected to bed 16 by a machine screw 94 defining a vertical pivot point about which second arm 84 is swingable between a first position, seen in FIG. 7 wherein lateral side 90 is parallel to the axial direction, and laterally spaced apart from the kerf K of saw blade B so as not to interfere therewith, and a second position seen in FIG. 8 wherein lateral side 92 is aligned with fixed arm 82. Central portion 86 has an arcuate slot 96 formed therein radiused on pivot point 94, and bed 16 is provided with a plurality of openings 98 therein for receiving an indexing screw 98A passing through slot 96 to permit the fixing of second arm 84 at any desired angle but in at least the first and second positions wherein lateral side 92 subtends an angle of 90° and 180° respectively to fixed arm 82.

Figure 2:
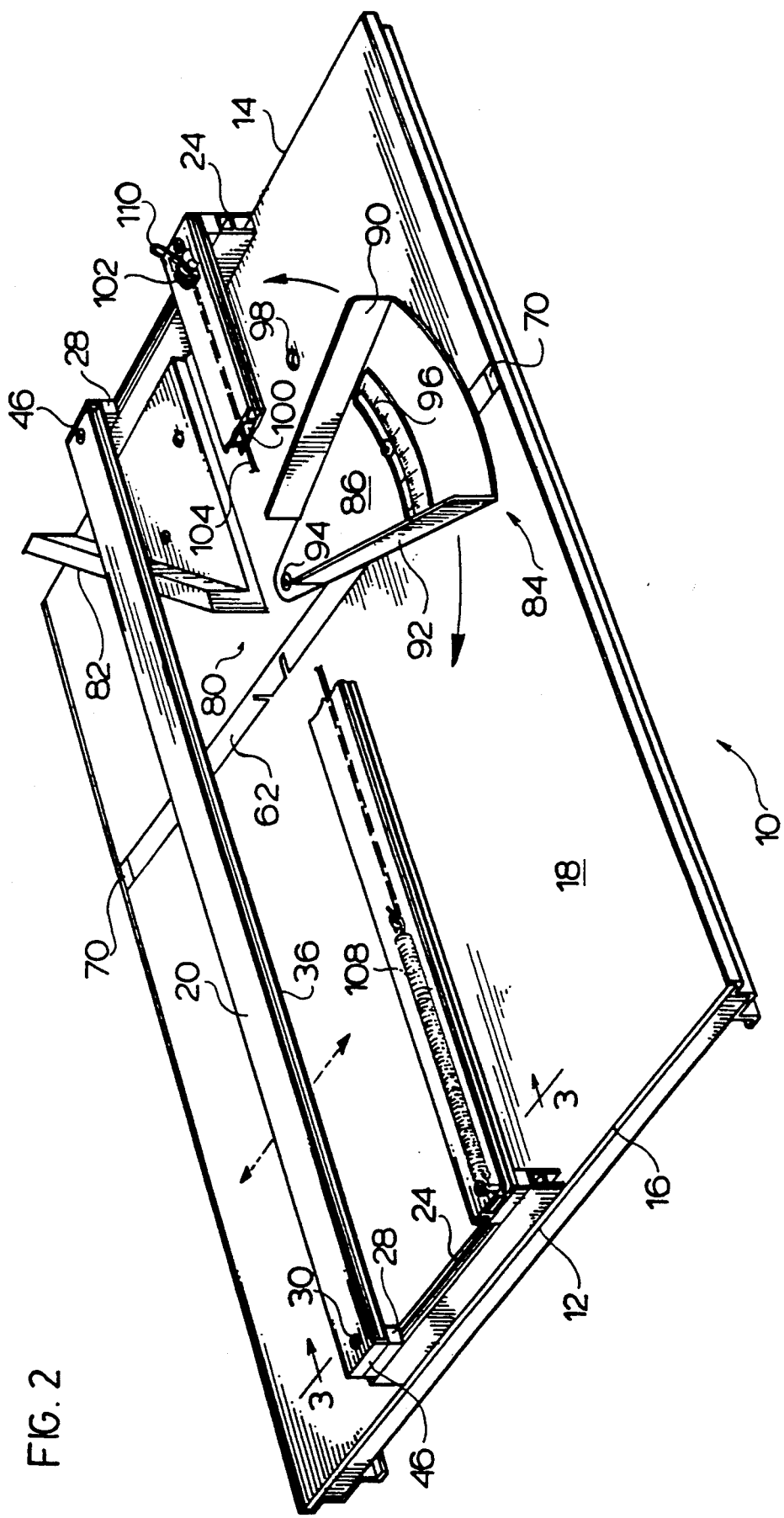
FIG. 2 is an isometric view of the saw table of FIG. 1 from the top, front, right side, sans saw, with a rail broken to reveal detail, and in another mode of adjustment.
Figure 3:
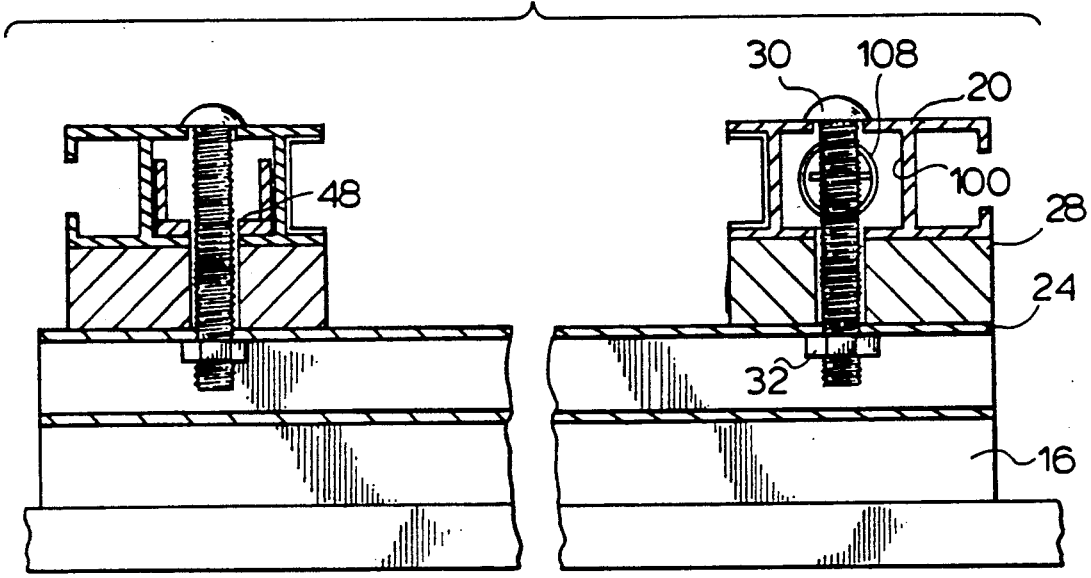
FIG. 3 is a section 3—3 of FIG. 2.
Figure 4:
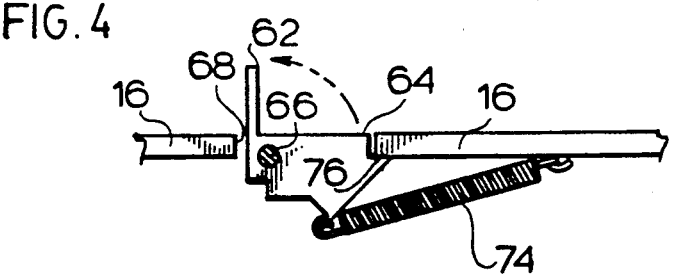
FIG. 4 is a section 4—4 of FIG. 1.
Figure 5:
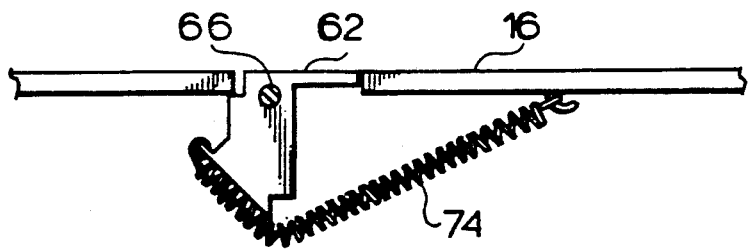
FIG. 5 is similar to FIG. 4, but shows a second position of adjustment.
Figure 6:
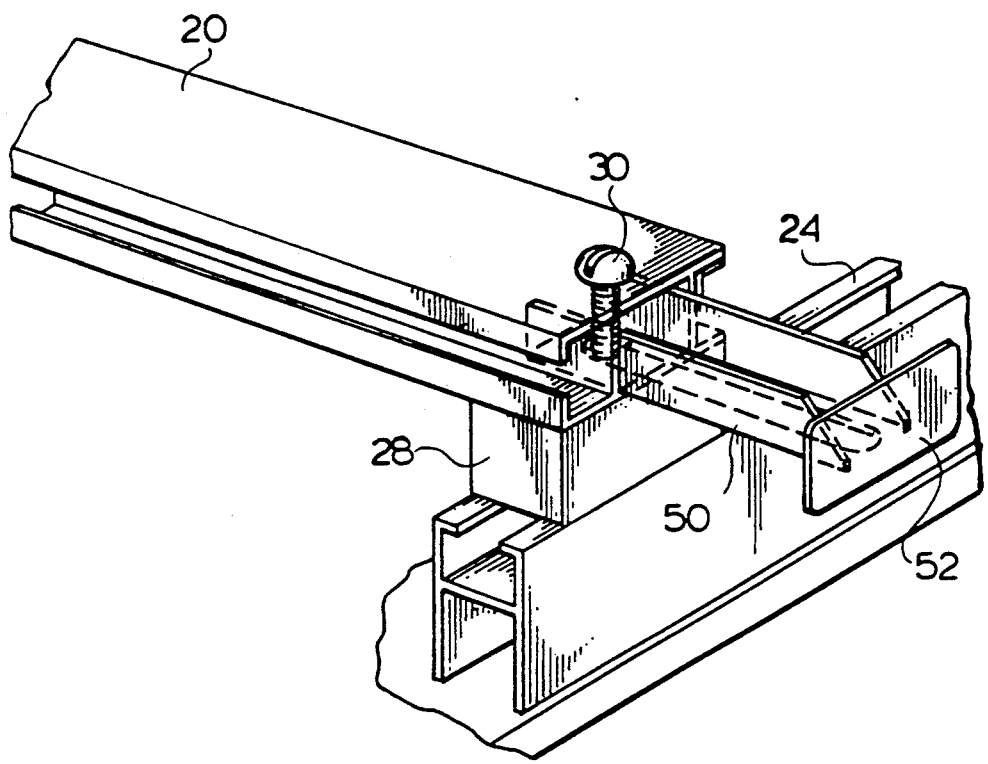
FIG. 6 is an isometric view of the forward end of the left rail of the table, with a travel stop shown in its telescopically extended position.

The right hand side rail, as viewed in FIGS. 1 and 2, is hollow, so providing a longitudinal opening 100 extending therethrough; a pulley sheave 102 is mounted on this rail adjacent the rearward end thereof in alignment with opening 100 for rotation in a vertical plane. A tether 104 including a first inextensible portion comprising cord 106 passes around sheave 102 to extend within opening 100 eighty-five per cent of the length thereof. Tether 104 further includes a second, extensible, portion in the form of a light helical spring 108 which connects between the cord 106 and the forward end of the rail, to screw 30. A hook 110 connects to the free end of cord 106 adjacent sheave 102. The arrangement is such as to permit hook 110 to extend against the influence of a light biasing force provided by spring 108, to proximate the forward end 12 of the table 10. In use hook 110 is secured to the blade guard G of saw 40 so as to maintain it in a retracted position along the length of travel of the saw on tracks 36.

It will be apparent that many changes may be made to the illustrative embodiment, while falling within the scope of the invention and it is intended that all such changes be covered by the claims appended hereto.

I claim:

1. In a saw table comprising:
    a bed;
    said bed including an upper generally planar surface, having a forward end and a rearward end opposed thereto defining a longitudinal axial direction therebetween;
    a pair of transversely spaced longitudinally aligned rails extending between said opposed ends;
    means locating adjacent each said end for securing said rails in spaced above relation to said bed surface;
    said rails being adapted to mount a circular saw by the sole plate thereof for movement along said rails between the ends of said table;
    a miter fence comprising a pair of arms in a V formation located adjacent the rearward end of said bed and pointing towards said forward end;
    the improvement comprising a cross-cut fence located forwardly of said miter fence;
    said cross-cut fence including a transversely extending first wall, and hinge means mounting said cross-cut fence for rotation about a transverse axis between a first position wherein said first wall is upstanding from said bed surface and a second position wherein said first wall does not protrude above in said bed surface.

2. A saw table as defined in claim 1, further comprising spring means biasing said cross-cut fence wall to said first position.

3. A saw table as defined in claim 2, wherein said cross-cut fence includes indexing means acting to constrain further rotary movement of said cross-cut fence under the influences of said biasing spring when said first wall moves from said second position into said first position.

4. A saw table as defined in claim 1, wherein said cross-cut fence comprises a second wall in orthogonal relation to said first wall, and wherein when said cross-cut fence is in said first position, said second wall is coplanar with said bed surface.

5. A saw table as defined in claim 4, wherein said bed is provided with a slot within which said cross cut fence is mounted, and wherein said slot is substantially closed by said cross-cut fence when rotated into said first or second positions.

6. A saw table as defined in claim 1, wherein said miter fence comprises a first member secured in fixed relationship to said bed at an angle of 45° to said longitudinal axis and a second member mounted from said bed for rotary movement about a vertical axis between a first position and a second position wherein said second member respectively subtends an angle of 90° and 180° relative to said first member, and in the 180° position is aligned with the first member.

7. A saw table as defined in claim 6, including means for indexing said second member in at least said first position.

8. A saw table comprising a bed extending in axial and transverse directions;
    said bed having an upper, generally planar surface for supporting a workpiece to be sawn thereon;
    said bed having a transversely extending slot in said upper surface;
    a transversely extending fence member;
    means mounting said fence member to said bed for rotation about a transverse axis between first and second positions,
    said fence member in said first position being upstanding from said surface to form an abutment for locating said workpiece, and in said second position being substantially contained within said slot so as not to form an impediment for said workpiece.

9. A saw table as defined in claim 8 comprising means for biasing said fence member towards said first position.

10. A saw table as defined in claim 8 wherein said fence member when in said first and second position substantially closes said slot.

11. A saw table as defined in claim 8 wherein said table comprises a lower surface and wherein said slot is in communication with said lower surface.

* * * * *